(12) United States Patent
Choi et al.

(10) Patent No.: US 8,787,614 B2
(45) Date of Patent: Jul. 22, 2014

(54) SYSTEM AND METHOD BUILDING A MAP

(75) Inventors: Hyun-Do Choi, Yongin-si (KR);
Woo-Yeon Jeong, Seoul (KR)

(73) Assignee: Samsung Electronics Co., Ltd.,
Suwon-Si (KR)

( * ) Notice: Subject to any disclaimer, the term of this patent is extended or adjusted under 35 U.S.C. 154(b) by 426 days.

(21) Appl. No.: 13/099,866

(22) Filed: May 3, 2011

(65) Prior Publication Data

US 2011/0268349 A1 Nov. 3, 2011

(30) Foreign Application Priority Data

May 3, 2010 (KR) .......................... 10-2010-0041586

(51) Int. Cl.
*G06K 9/00* (2006.01)

(52) U.S. Cl.
USPC .......................................... 382/100; 382/153

(58) Field of Classification Search
USPC .................................................. 382/100, 153
See application file for complete search history.

(56) References Cited

U.S. PATENT DOCUMENTS

| 7,920,941 | B2 * | 4/2011 | Park et al. ...................... 700/259 |
| 7,957,836 | B2 * | 6/2011 | Myeong et al. ................ 700/253 |
| 8,060,254 | B2 * | 11/2011 | Myeong et al. ................ 700/253 |
| 8,255,081 | B2 * | 8/2012 | Lee et al. ...................... 700/245 |
| 8,331,652 | B2 * | 12/2012 | Yoon et al. .................... 382/153 |
| 8,515,613 | B2 * | 8/2013 | Tanaka et al. .................. 701/25 |
| 2007/0271011 | A1 * | 11/2007 | Lee et al. ........................ 701/25 |
| 2008/0310757 | A1 | 12/2008 | Wolberg et al. |
| 2010/0070125 | A1 * | 3/2010 | Lee et al. ........................ 701/28 |

FOREIGN PATENT DOCUMENTS

| EP | 1 857 978 | 11/2007 |
| JP | 2009-237845 | 10/2009 |
| JP | 2009-237846 | 10/2009 |
| JP | 2009-237847 | 10/2009 |
| JP | 2009-237848 | 10/2009 |
| KR | 10-0757937 | 9/2007 |
| KR | 10-2009-0044118 | 5/2009 |
| KR | 10-2009-0075399 | 7/2009 |

\* cited by examiner

*Primary Examiner* — Tom Y Lu
(74) *Attorney, Agent, or Firm* — Staas & Halsey LLP

(57) ABSTRACT

A system building a map while an image sensor is moving, the system including the image sensor configured to capture images while the image sensor moves relative to one or more different locations, a sub-map building unit configured to recognize a relative location for at least the image sensor of the system using the captured images, build up a sub-map, and if a condition for stopping a building of the sub-map is met, store the sub-map which has been so far built up, an operation determining unit configured to determine whether the condition for stopping building the sub-map, an image group storing unit configured to store an image group including images that are newly captured from the image sensor after the storing of the sub-map when the condition for the stopping of the building of the sub-map is satisfied, and an overall map building unit configured to build an overall map based on the built sub-map and the stored image group when a current relative location for at least the image sensor of the system is determined to be same as a previous relative location for at least the image sensor of the system.

20 Claims, 4 Drawing Sheets

SYSTEM AND METHOD BUILDING A MAP

CROSS-REFERENCE TO RELATED APPLICATIONS

This application claims the benefit under 35 U.S.C. §119 (a) of Korean Patent Application No. 10-2010-0041586, filed on May 3, 2010, in the Korean Intellectual Property Office, the entire disclosure of which is incorporated herein by reference for all purposes.

BACKGROUND

1. Field

One or more embodiments in the following description relate to a system and method building a map, and more particularly, to a system and method building an entire map based on images captured by a moving imaging device, including a system and method of a mobile robot building an entire map based on images captured by an imaging device of the mobile robot while the mobile robot is moving.

2. Description of the Related Art

Simultaneous localization and mapping (SLAM) algorithms have been used as methods for recognizing self-position while building a map. A SLAM algorithm allows a mobile robot to build up a map of its surroundings while at the same time keeping track of its current location based on the created map, so that the location of the mobile robot and the map of surroundings can be estimated simultaneously. However, in the course of executing the SLAM algorithm, there may occur a sudden change in a position of a camera that is used to build a map, for example, when a mobile robot encounters slip, resulting in inaccurate recognition of position and/or posture of a mobile robot. Thus, errors are generated in the created map.

SUMMARY

In one or more embodiments, there is provided a system building a map while an image sensor is moving, the system including the image sensor configured to capture images while the image sensor moves relative to one or more different locations, a sub-map building unit configured to recognize a relative location for at least the image sensor of the system using the captured images, build up a sub-map, and if a condition for stopping a building of the sub-map is met, store the sub-map which has been so far built up, an operation determining unit configured to determine whether the condition for stopping building the sub-map, an image group storing unit configured to store an image group including images that are newly captured from the image sensor after the storing of the sub-map when the condition for the stopping of the building of the sub-map is satisfied, and an overall map building unit configured to build an overall map based on the built sub-map and the stored image group when a current relative location for at least the image sensor of the system is determined to be same as a previous relative location for at least the image sensor of the system.

The sub-map building unit may be configured to build up a sub-map by performing simultaneous localization and mapping (SLAM) which includes building up a map while at a same time recognizing a current location.

The overall map building unit may be configured to build up an overall map by performing bundle adjustment on the sub-map and the stored image group.

The operation determining unit may be configured to determine that the condition for the stopping of the building of the sub-map is satisfied when uncertainty of each of one or more feature points included in the sub-map is greater than a predefined value.

The operation determining unit may be further configured to determine that the condition for the stopping of the building of the sub-map is satisfied either when a number of feature points in the captured image is smaller than a feature points threshold value, when a number of particles set in the captured image is smaller than a particles set threshold value, or when feature points are unevenly distributed in the captured image.

The operation determining unit may be further configured to determine that the condition for the stopping of the building of the sub-map is satisfied when a slip is detected.

The operation determining unit may be further configured to determine whether a condition for building a new sub-map is satisfied while the image group storing unit is storing the image group, and if the condition for the building of the new sub-map is satisfied, stop storing the image group and control the sub-map building unit to build up the new sub-map.

The condition for building a new sub-map may be satisfied either when more than a predetermined number of images are stored, or when the image sensor moves more than a predetermined distance.

The system may further include a loop closing performing unit configured to determine whether the current relative location is the same as the previous relative location.

In or more embodiments, there is provided a method of building a map, the method including recognizing a current relative location for at least an image sensor of a system and building a sub-map based on images captured while the image sensor moves relative to one or more different locations, stopping the building of the sub-map and storing the sub-map built up so far when a condition for the stopping of the building of the sub-map is satisfied, and storing an image group including images that are newly captured from the image sensor after the storing of the sub-map, and in response to a determination that a current relative location for at least the image sensor of the system is same as a previous relative location for at least the image sensor of the system, building an overall map based on the built sub-map and the stored image group.

Additional aspects and/or advantages will be set forth in part in the description which follows and, in part, will be apparent from the description, or may be learned by practice of one or more embodiments of the present invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
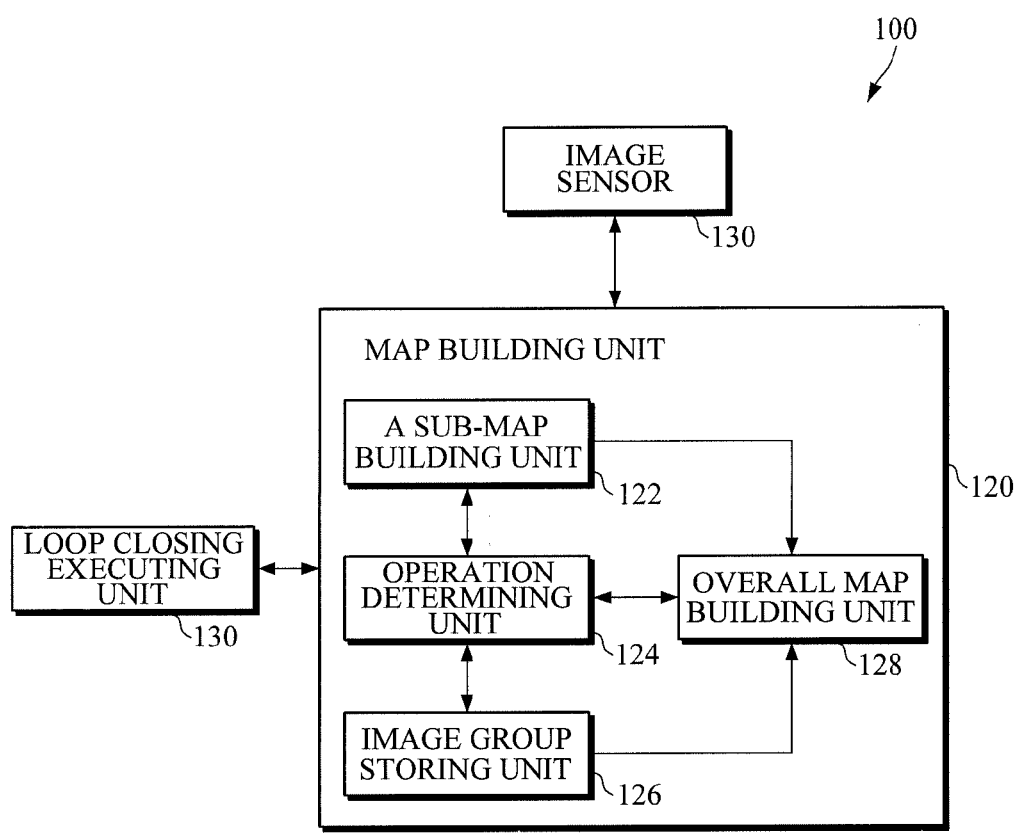
FIG. 1 illustrates a map building system, according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates a map building system, according to one or more embodiments. The map building system 100 may include an image sensor 110, a map building unit 120, and a loop closing executing unit 130, for example. The map building system 100 may be implemented as a camera, a mobile robot, and a terminal system having a camera, also as only examples.

The image sensor 110 may capture an image of a surrounding and convert the captured image into a digital signal. The image sensor 110 may include a charge coupled device (CCD) module or a complementary metal oxide semiconductor (CMOS) module. The image sensor 110 may capture images at different positions as the map building system 100 moves. If the map building system 100 is a terminal system having a camera, the image sensor 110 may capture images at different positions while a user, or attached device, is moving, carrying the terminal system with him/her. If the map building system 100 is a mobile robot, images may be captured at different positions as the mobile robot moves.

The map building unit 120 may include a sub-map building unit 122, an operation determining unit 124, an image group storing unit 126, and an overall map building unit 128, for example.

The sub-map building unit 122 may recognize a current position of the map building system 100 based on the images captured from the image sensor 110 and build a map while the map building system 100 moves. The sub-map building unit 122 may store feature points extracted from the image captured from the image sensor 110, feature point descriptors for identifying the feature points, and uncertainty information on the feature points. The sub-map building unit 122 may use a simultaneous localization and mapping (SLAM) to build the map and at the same time track the location of the map building system 100.

In this example, the feature point may be a point that characterizes a shape of an object, e.g., an edge or corner of the object. The feature point may be referred to as a landmark, based on which a map is drafted. In addition, the feature point may be a line or a point extracted from an outline of a closed region. For example, in a ceiling image that is captured by capturing the ceiling of an indoor environment, a line or a point may be extracted from a circular or rectangular outline of a light and used as a feature point. Additionally, in this case, the feature point descriptor may be a local image, information of directivity of the image, or vector information, which enables identification of the feature point.

The sub-map building unit 122 may generate a feature point and a feature point descriptor using various feature point extraction algorithms, for example, a scale-invariant feature transform (SIFT) scheme, a maximally stable external region (MSER) scheme, or a Harris corner detector method. The feature point descriptor may be a local image of the feature point, information of directivity of the image, or vector image, which allows the feature point to be distinguished from others. The local image of the feature point may be referred to as an image patch.

The sub-map building unit 122 may estimate a location of the map building system 100 with reference to a starting location and a direction angle of the map building system 100 at the time of start. A certain feature point on a map may be a reference point of the location of the map building system 100. Thus, location information of the map building system 100 may include a location and a direction angle of the map building system 100 with respect to a feature point recognized by the map building system 100. The sub-map building unit 122 may estimate a location using a location estimation algorithm, for example, a particle filter and a Kalman filter.

The sub-map building unit 122 may recognize a location and build a map using the captured images, and store the generated map until conditions for stopping building a sub-map are satisfied. In one or more embodiments, the sub-map building unit 122 may include a storage space storing the sub-map or the storage may be provided externally.

The operation determining unit 124 may determine whether the conditions for stopping building a sub-map are satisfied. The operation determining unit 124 may be allowed to stop building the sub-map when uncertainty of a location of a feature point is greater than a given value.

The uncertainty of a location of a feature point may be calculated from, for example, an error covariance matrix of the Kalman filter. If a current location of a mobile robot (i.e., map building system 100) and feature points of the captured images are processed using the extended Kalman filter, the covariance with respect to an estimated location of the mobile robot and covariance values with respect to the respective feature points may be derived from the error covariance matrix generated by performing the extended Kalman filter. Procedures of deriving a covariance for a location of a mobile robot and covariance values for respective feature points are widely well-known, and thus the detailed description thereof will be omitted.

Moreover, the operation determining unit 124 may determine that the conditions for stopping building the sub-map is satisfied when the number of feature points in the captured image is smaller than a threshold value, when the number of particles set for the captured image is smaller than a threshold value, or when feature points are unevenly distributed over the captured image. To define whether the feature points are unevenly distributed over the image, a degree of deviation of the feature points from the center of the image is calculated by finding the mean of two-dimensional locations of the feature points belonging to the image.

The image group storing unit 126 may store an image group including images that are newly captured from the image sensor 110 after the sub-map has been stored when the conditions for stopping building the sub-map are satisfied. The image group storing unit 126 may store each new image which has not previously been used to build the sub-map, extract feature points from the new image, and generate feature point descriptors corresponding to the feature points. In one of more embodiments, the image group storing unit 126 may use the same feature point extraction algorithm for extracting feature points as the sub-map generating unit 122 uses.

In addition, the operation determining unit 124 may determine whether a condition for building a new sub-map is satisfied while the image group is being stored, and if the condition for building the new sub-map is satisfied, stop storing the image group and control the sub-map building unit 122 to build a new sub-map. The condition for building a new sub-map may be satisfied when the image group storing unit 126 stores more than a predetermined number of images, or when the image sensor 110 moves more than a predetermined distance. The condition for building a new sub-map may include conditions that do not satisfy the conditions for stopping building a sub-map.

The sub-map building operation by the sub-map building unit 122 and the image group storing operation by the image group storing unit 126 may be repeatedly performed until the loop closing executing unit 130 detects loop closing.

The loop closing executing unit 130 performs loop closing. Loop closing determines whether the map building system 100 moves a predetermined distance and then returns to a location visited before. For the loop closing, a point corresponding to a location at which the map building system 100 has been placed is found on a feature point map or a grid map, and the location and the found point are connected to each other, so that a path of the map building system 100 is adjusted.

The overall map building unit 128 may build an overall map based on the generated sub-map and the stored image group in response to determining the map building system 100 being located at a position visited before.

The overall map building unit 128 may generate the overall map by performing bundle adjustment which enables a subsequent obtaining of an optimal camera motion and restoration of a three-dimensional image optimized to an observation result of all images, according to one or more embodiments. By such bundle adjustment, pieces of information of all captured images are integrally used, and hence an overall consistent map with a higher accuracy can be captured, compared to when a map is built based only on a probability-based scheme such as the Kalman filter and a particle filter.

The bundle adjustment is a method of optimizing simultaneously a spatial location of a feature point and a projection function P that indicates a location of a camera. The bundle adjustment may be represented by a cost function, as shown in the below Equation 1, and as only an example.

$$\min_{P_i, X_j} \sum_{i,j} d(Q(P_i, X_j), x_{ij})^2 \qquad \text{Equation 1}$$

Here, a vector $P_i$ indicates a location of a camera that obtains the ith image, and a vector $X_j$ indicates a three-dimensional location of the jth point. $x_{ij}$ denotes a projection of the jth point of the ith image, $Q(P_i, X_j)$ denotes a predicted projection of the ith point of the jth image, and $d(x, y)$ denotes a Euclidean distance between points represented by a vector x and a vector y.

Finding values of P and X that make the sum of Equation 1 a minimum is a target of the bundle adjustment. To solve this problem, a Levenberg-Marquardt (LM)-based algorithm is generally used. As a constraint for optimization, for example, a location of feature points determined as being identical, also as only an example, by the loop closing executing unit 130 may be used. As another constraint for optimization, locations of feature points of a sub-map built between one stored image group and another stored image group may be used.

It is assumed that one image group is referred to as a first image group, another image group is referred to as a second image group and the first image group is stored prior to the second image group. In this example, in a sub-map built between the first image group and the second image group, feature points extracted from an image used first to build the sub-map correspond to the last image of the first image group, and feature points extracted from an image used last to build the sub-map correspond to the first image of the second image group.

In this example, feature points included in the sub-map which correspond to the feature points of the first image group are not limited to the image used first to build the sub-map, and may include feature points extracted when the sub-map is initially built. Similarly, feature points included in the sub-map which correspond to the feature points of the second image group are not limited to the image used last to build the sub-map, and may include feature points extracted when the building of the sub-map is almost complete. A correlation between the feature points may be determined by use of a method, for example, sum of squared difference (SSD) or normalized cross correlation (NCC).

In the sub-map, when a location of a feature point of the image that is used first to build the sub-map is determined, the determining of a location of a feature point extracted from the image that is used last for the sub-map may be performed. Hence, locations of feature points extracted from a sub-map generated between the first image group and the second image group may be used as constraints.

However, operation of the overall map building unit 128 is not limited to those cited in the above example, and various schemes for real-time data processing may be utilized. Additionally, when the loop closing is determined, as the examples described above, global bundle adjustment may be performed only once, but to expedite the calculation, local bundle adjustment may be performed on each image group and thereafter global bundle adjustment may be performed using the local bundle adjustment result. Moreover, the extraction of feature points from a received new image by the image group storing unit 126 and the optimization during the bundle adjustment by the overall map building unit 128 may be performed in parallel.

The map building system 100 described in the above examples may be implemented as a mobile robot, and be used to build a traveling path of the mobile robot. In addition, the map building system 100 may be mounted on a camera, and capture images of an area in which a user moves, so that the map building system 100 build an overall map of the area based on the captured images.

In one embodiment, the map building system 100 may store image data of a region for which an accuracy of a map may be deteriorated because a camera is dynamically moved while building a map and recognizing a location of the map building system in real time, and build an accurate overall map based on the built sub-map and the stored image data.

Figure 2:
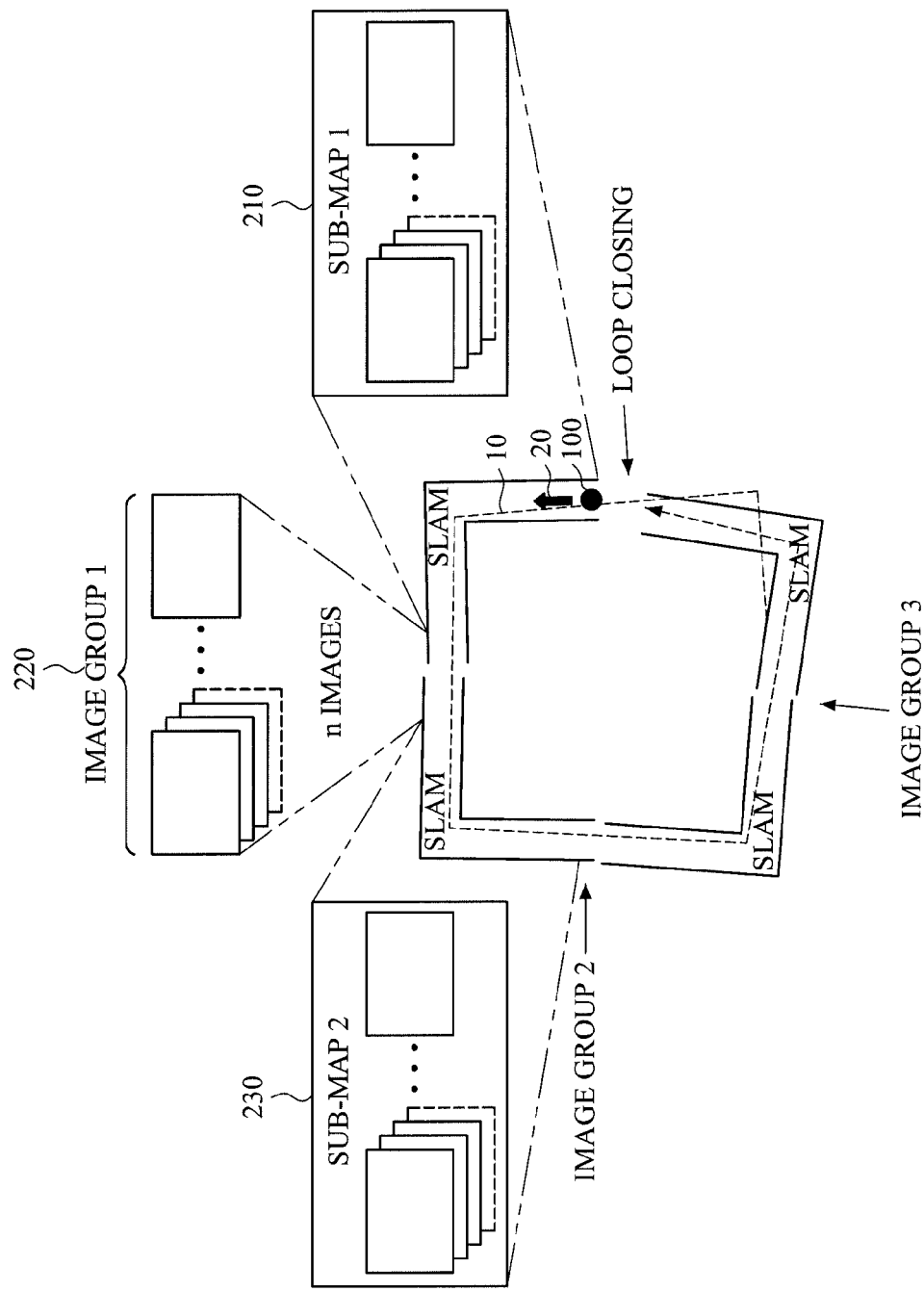
FIG. 2 illustrates aspects of a map building method, according to one or more embodiments.

FIG. 2 illustrates aspects of a map building method, according to one or more embodiments. As only an example, and dependent on embodiment, the map building method may be performed by the map building system illustrated in FIG. 1. Though the map building method is described below with reference to FIG. 1, embodiments should not be limited by the same, as alternate systems and devices may implement one or more of the method operations.

It is assumed that the map building system 100 starts from a start point illustrated in FIG. 2, and builds a map while moving along a path 20 indicated by a dotted line 10. The map building system 100 may build a sub-map 1 210 by performing a SLAM algorithm while moving along the path 20 depicted as an arrow from the start point.

The map building system 100 may stop building the sub-map 1 210 when a condition for stopping building the sub-map is satisfied, store the sub-map 1 210, and store newly captured images. A first image group 220 may include images that are stored until a new sub-map starts being build after the sub-map 1 is stopped being built.

In addition, the map building system 100 may build a new sub-map when a condition for building a new sub-map is satisfied. A sub-map 2 230 may be continuously built until a condition for stopping building a sub-map is satisfied again. If the above operations are repeated, at least one sub-map may be completed until loop closing is detected. The sub-map may be accurate in terms of locations of feature points, but a correlation of locations of feature points between one sub-map and the other may not have been yet defined.

As such, the map building system 100 may build the sub-map, repeatedly store image groups, and when loop closing is detected, perform bundle adjustment using the built and stored sub-maps and images of the stored image groups, thereby building an overall map. A feature point may be extracted from each image in the image group, and a correlation between feature points first extracted from the image group and feature points involved in building the sub-map stored immediately before the image group is defined, so that locations of feature points of images in the image group and a location and a posture of the image building system 100 can be determined.

Figure 3:
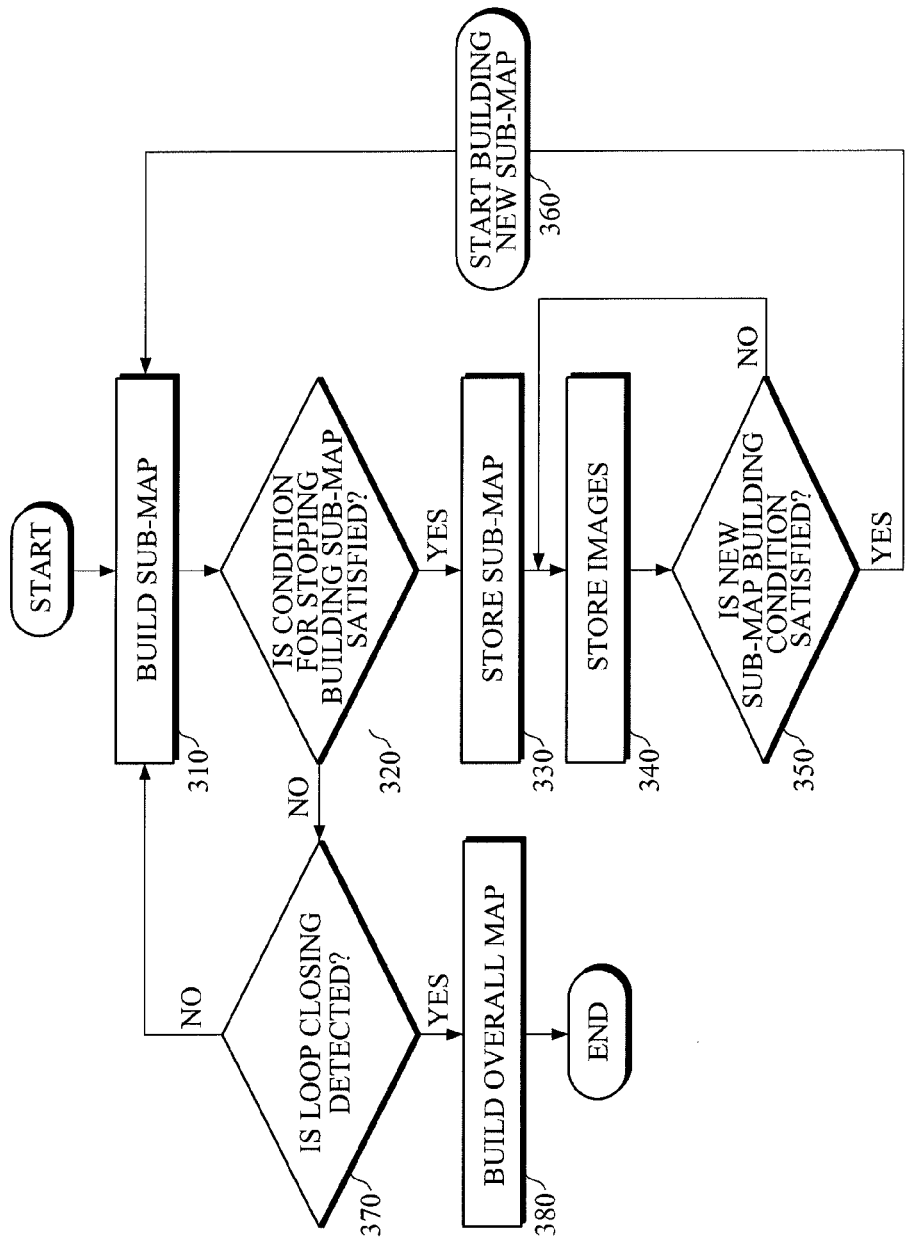
FIG. 3 further illustrates a flow chart of a map building method, according to one or more embodiments.

FIG. 3 a flowchart of a map building method, according to one or more embodiments. Again, as only an example and depending on embodiment, such a map building method may be performed by the map building system illustrated in FIG. 1. Though the map building method is described below with reference to FIG. 1, embodiments should not be limited by the same, as alternate systems and devices may implement one or more of the method operations The map building system 100 may recognize its location and build a sub-map on the basis of images captured while moving (operation 310).

The map building system 100 determines whether a condition has been met for stopping the building of the sub-map (operation 320). It may be periodically checked whether the condition is satisfied, while the sub-map is being built up.

If the condition for stopping the building of the sub-map is determined to be satisfied, the map building system 100 may stop building the sub-map and stores the sub-map that has been built up so far (operation 330), and stores newly input images (operation 340). The newly input images are stored in an accumulating manner until a condition for building a new sub-map is satisfied. In this case, the images that are stored, until the condition for the stopping of the building of the sub-map is determined to be satisfied, form an image group. Upon storing the images included in the image group, feature points may be extracted from the images.

If it is determined that the condition for building a new sub-map is satisfied (operation 350), the map building system 100 starts building a new sub-map (operation 360), and returns to the operation of building the sub-map (operation 310).

If it is determined that the condition for building a new sub-map is not satisfied (operation 350), the map building system 100 continuously stores newly input images in addition to the previously captured images.

When loop closing is detected (operation 370), which indicates that the map building system 100 is located at a position where it has been before, the image building system 100 builds an overall map using the stored image group and the sub-map built by way of bundle adjustment (operation 380). In the example illustrated in FIG. 3, the determination whether the loop closing is detected or not (operation 370) is described as being performed after operation 320, but it is only an example, and the determination may occur repeatedly between operation 310 through operation 360.

Figure 4:
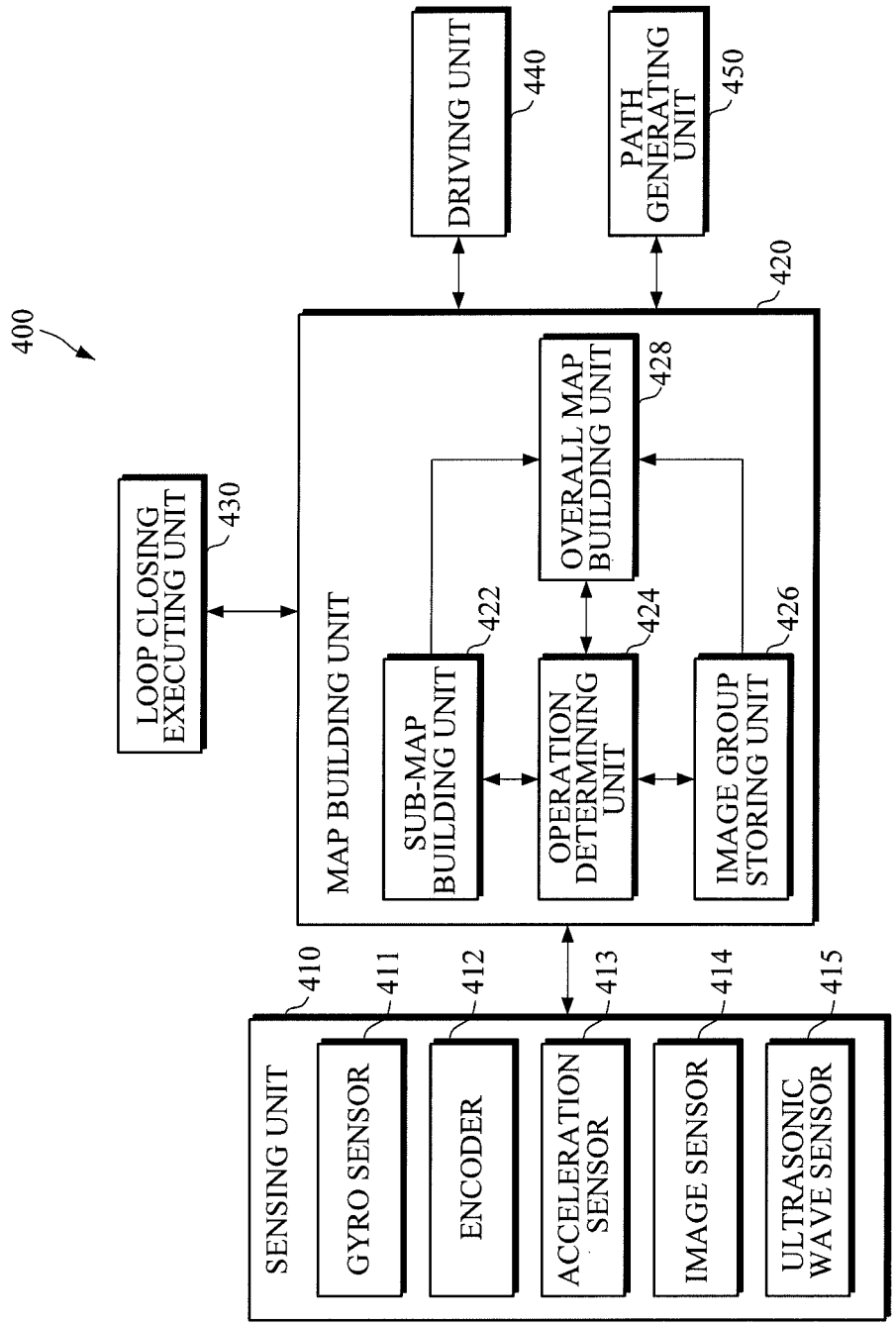
FIG. 4 illustrates a map building system which may be implemented as a mobile robot, according to one or more embodiments.

FIG. 4 illustrates a map building system, e.g., which may be implemented as a mobile robot, according to one or more embodiments. Referring to the example illustrated in FIG. 4, as the map building system, the mobile robot 400 may include a sensing unit 410, a map building unit 420, a loop closing executing unit 430, a driving unit 440, and a path generating unit 450, for example. An image sensor 414 included in the sensing unit 410, the map building unit 420, and the loop closing executing unit 430 may, respectively, correspond to the image sensor 110, the map building unit 120, and the loop closing executing unit 130 which are illustrated in FIG. 1, and perform the same operations, in one or more embodiments. Hereinafter, rather than repeating above discussions of one or more embodiments relative to FIG. 1 in discussing elements and operation of FIG. 4, the below description focuses on elements and operation relative to FIG. 4 that may have not been discussed above.

The sensing unit 410 may include a gyro sensor 411, an encoder 412, an acceleration sensor 413, an image sensor 414, and an ultrasonic wave sensor 415, for example.

The gyro sensor 411 may detect an actual rotation angle of the mobile robot 400. The encoder 412 may be installed on a rotation axis of a wheel, and be used to track a path along which the mobile robot 400 actually moves. More specifically, a distance and direction of the movement of the mobile robot 400 may be integrated by the encoder 412, so that a current position and direction angle of the moving mobile robot 400 can be estimated. Generally, the encoder 412 may calculate an accurate result for a short distance, but the errors may be accumulated as the integration is continued. The acceleration sensor 413 may sense the acceleration of the mobile robot 400. The ultrasonic wave sensor 415 may sense obstacles for building an obstacle map. To sense the obstacles, in one or more embodiments the sensing unit 410 may further include an infrared sensor and a laser sensor.

The sub-map building unit 422 may estimate and recognize a current location by entirely using odometry information, information of an angular velocity and acceleration, and information of the extracted feature points which are captured by the driving unit 440 and the sensing unit 410. Here, in one or more embodiments and as only an example, the map building unit 420 may include a memory or storage device, e.g., as a non-transitory medium, which may include the below discussed computer readable code. In one or more embodiments, the map building unit 420 may further include a transmission/reception device part of the below discussed distributed network.

The operation determining unit 424 may determine that a condition for stopping the building of the sub-map is satisfied when a slip is detected. The operation determining unit 424 may detect the slip using sensing information from, at least, one of the gyro sensor 421, the encoder 422, and the acceleration sensor 423.

For example, the operation determining unit 424 may detect sudden current consumption in a situation where the wheel is under control to maintain its rotation speed. Since the sudden current consumption indicates a change of torque on the wheel, a collision with impurities on the ground or with an obstacle can be detected through the detection of the sudden current consumption.

Alternatively, the operation determining unit 424 may calculate a speed of the mobile robot 400 using a value of the encoder 412 on the wheel, and calculate an estimate of acceleration of the mobile robot 400 by differentiating the speed. The estimate of acceleration is almost true when there is no slip between the wheel and the ground. Thus, the occurrence of a slip can be detected using the estimate from the encoder 412 and a measurement value captured by the acceleration sensor 413. The operation determining unit 424 may determine the occurrence of the slip when a difference between the estimate and the value of the acceleration sensor 413 is greater than a predefined value.

For another example, the operation determining unit 424 may recognize a linear velocity and angular velocity of the mobile robot 400 using the value of the encoder 412 on each wheel. The angular velocity may be calculated by dividing a difference between the values of the encoders 412 on both wheels by a distance between the wheels. If a difference between the estimate of the angular velocity and the value measured by the gyro sensor 411 is determined to be significantly large, according to a predetermined metric, it may be determined that a slip occurs.

The operation determining unit 424 may transmit a slip detection signal to the sub-map building unit 422 each time a slip is detected. In response to receiving the slip detection signal, the sub-map building unit 422 may determine that a condition for stopping the building of the sub-map is satisfied. As the result, the sub-map building unit 422 may stop building the sub-map, and store the sub-map which has been built up so far. In response to receiving the slip detection signal, the image group storing unit 424 may store images newly input from the image sensor 414 in an accumulating manner, extract feature points from the images, and generate feature point descriptors.

The image group storing unit 424 may stop storing an image group when a slip is no longer detected. The sub-map building unit 422 may determine that a condition for building a new sub-map when a slip is no longer detected, and build up a new sub-map on the basis of images newly received after the determination has made.

The driving unit 440 may include a driving system, which may include wheels for moving the mobile robot 400, and a driving source that provides driving power to the driving system, for example. The path generating unit 450 may generate a path using location information of the mobile robot 400 that is recognized by the sub-map building unit 422, and a built overall map.

In one or more embodiments, any apparatus, system, and unit descriptions herein include one or more hardware devices or hardware processing elements. For example, in one or more embodiments, an image sensor may include any hardware image capturing device, such as a CCD, as only an example, and may further include one or more hardware processing elements. The loop closing executing unit and/or the map building unit may equally include one or more hardware elements, such as a hardware processing element. In one or more embodiments, any described apparatus, system, and unit may further include one or more desirable memories, and any desired hardware input/output transmission devices. Further, the term apparatus should be considered synonymous with elements of a physical system, not limited to a single enclosure or all described elements embodied in single respective enclosures in all embodiments, but rather, depending on embodiment, is open to being embodied together or separately in differing enclosures and/or locations through differing hardware elements or devices.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The non-transitory media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A system building a map while an image sensor is moving, the system comprising:
    the image sensor configured to capture images while the image sensor moves relative to one or more different locations;
    a sub-map building unit configured to recognize a relative location for at least the image sensor of the system using the captured images, build up a sub-map, and if a condition for stopping a building of the sub-map is met, store the sub-map which has been so far built up;
    an operation determining unit configured to determine whether the condition for stopping building the sub-map;
    an image group storing unit configured to store an image group including images that are newly captured from the image sensor after the storing of the sub-map when the condition for the stopping of the building of the sub-map is satisfied; and
    an overall map building unit configured to build an overall map based on the built sub-map and the stored image group when a current relative location for at least the image sensor of the system is determined to be same as a previous relative location for at least the image sensor of the system.

2. The system of claim 1, wherein the sub-map building unit is configured to build up a sub-map by performing simultaneous localization and mapping (SLAM) which includes building up a map while at a same time recognizing a current location.

3. The system of claim 1, wherein the overall map building unit is configured to build up an overall map by performing bundle adjustment on the sub-map and the stored image group.

4. The system of claim 1, wherein the operation determining unit is configured to determine that the condition for the stopping of the building of the sub-map is satisfied when uncertainty of each of one or more feature points included in the sub-map is greater than a predefined value.

5. The system of claim 1, wherein the operation determining unit is further configured to determine that the condition for the stopping of the building of the sub-map is satisfied either when a number of feature points in the captured image is smaller than a feature points threshold value, when a number of particles set in the captured image is smaller than a particles set threshold value, or when feature points are unevenly distributed in the captured image.

6. The system of claim 1, wherein the operation determining unit is further configured to determine that the condition for the stopping of the building of the sub-map is satisfied when a slip is detected.

7. The system of claim 1, wherein the operation determining unit is further configured to determine whether a condition for building a new sub-map is satisfied while the image group storing unit is storing the image group, and if the condition for the building of the new sub-map is satisfied, stop storing the image group and control the sub-map building unit to build up the new sub-map.

8. The system of claim 7, wherein the condition for the building of the new sub-map is satisfied either when more than a predetermined number of images are stored, or when the image sensor moves more than a predetermined distance.

9. The system of claim 1, further comprising:
a loop closing performing unit configured to determine whether the current relative location is the same as the previous relative location.

10. The system of claim 1, wherein the system is a mobile device, with the mobile device comprising:
a sensing unit comprising at least the image sensor; and
a driving unit to control movement of the mobile device relative to the one or more different locations.

11. The system of claim 10, wherein the mobile device is a mobile robot.

12. A method of building a map, the method comprising:
recognizing a current relative location for at least an image sensor of a system and building a sub-map based on images captured while the image sensor moves relative to one or more different locations, using at least one of one or more processing devices;
stopping the building of the sub-map and storing the sub-map built up so far when a condition for the stopping of the building of the sub-map is satisfied, and storing an image group including images that are newly captured from the image sensor after the storing of the sub-map, using at least one of the one or more processing devices; and
in response to a determination that a current relative location for at least the image sensor of the system is same as a previous relative location for at least the image sensor of the system, building an overall map based on the built sub-map and the stored image group, using at least one of the one or more processing devices.

13. The method of claim 12, wherein the building of the sub-map comprises performing SLAM which includes building up a map while at a same time recognizing a current location.

14. The method of claim 12, wherein the building of the overall map comprises performing bundle adjustment on the sub-map and the stored image group.

15. The method of claim 12, wherein the condition for the stopping of the building of the sub-map is satisfied when uncertainty of each of one or more feature points included in the sub-map is greater than a predefined value.

16. The method of claim 12, wherein the condition for the stopping of the building of the sub-map is satisfied either when a number of feature points in the captured image is smaller than a feature points threshold value, when a number of particles set in the captured image is smaller than a particles set threshold value, or when feature points are unevenly distributed in the captured image.

17. The method of claim 12, wherein the condition for the stopping of the building of the sub-map is satisfied when a slip is detected.

18. The method of claim 12, further comprising:
determining whether a condition for a building of a new sub-map is satisfied while storing the image group; and
when the condition for the building of the new sub-map is determined to have been satisfied, stopping the storing the image group and perform the building of the new sub-map.

19. The method of claim 18, wherein the condition for the building of the new sub-map is satisfied either when more than a predetermined number of images are stored, or when at least the image sensor of the system is determined to have moved more than a predetermined distance.

20. A mobile device, comprising:
a sensing unit comprising at least an image sensor;
a map building unit including a non-transitory medium comprising computer readable code to control at least one processing device to implement the map building method of claim 12; and
a driving unit to control movement of the mobile device relative to one or more different locations, under path movement control according to results of an implementation of the map building method by the map building unit.

* * * * *